United States Patent
Switzer et al.

(10) Patent No.: US 9,582,443 B1
(45) Date of Patent: Feb. 28, 2017

(54) SERIAL CONTROL CHANNEL PROCESSOR FOR EXECUTING TIME-BASED INSTRUCTIONS

(75) Inventors: Roger N. Switzer, Vancouver, WA (US); Paul J. Zeman, Boise, ID (US)

(73) Assignee: Marvell International Ltd., Hamilton (BM)

( * ) Notice: Subject to any disclaimer, the term of this patent is extended or adjusted under 35 U.S.C. 154(b) by 1270 days.

(21) Appl. No.: 13/013,274

(22) Filed: Jan. 25, 2011

Related U.S. Application Data (60) Provisional application No. 61/303,876, filed on Feb. 12, 2010.

(51) Int. Cl.
*G06F 13/38* (2006.01)
*G06F 13/28* (2006.01)

(52) U.S. Cl.
CPC ............ *G06F 13/385* (2013.01); *G06F 13/28* (2013.01)

(58) Field of Classification Search
CPC ................................. G06F 13/385; G06F 13/28
USPC .. 712/32, 38; 710/52, 54, 58, 65, 69, 71, 72
See application file for complete search history.

(56) References Cited

U.S. PATENT DOCUMENTS

| | | | |
|---|---|---|---|
| 4,754,216 A | 6/1988 | Wong | |
| 4,810,975 A | 3/1989 | Dias | |
| 5,450,360 A | 9/1995 | Sato | |
| 5,535,397 A | 7/1996 | Durante et al. | |
| 5,649,135 A | 7/1997 | Pechanek et al. | |
| 5,724,427 A | 3/1998 | Reeds, III | |
| 5,768,500 A | 6/1998 | Agrawal et al. | |
| 5,778,070 A | 7/1998 | Mattison | |
| 5,933,627 A | 8/1999 | Parady | |
| 5,943,493 A | 8/1999 | Teich et al. | |
| 5,961,577 A | 10/1999 | Soenen et al. | |
| 6,018,759 A | 1/2000 | Doing et al. | |
| 6,151,668 A | 11/2000 | Pechanek et al. | |
| 6,154,544 A | 11/2000 | Farris et al. | |
| 6,446,191 B1 | 9/2002 | Pechanek et al. | |
| 6,480,136 B1 | 11/2002 | Kranz et al. | |
| 6,536,024 B1 | 3/2003 | Hathaway | |
| 6,615,355 B2 | 9/2003 | Mattison | |
| 7,203,821 B2 | 4/2007 | Thimmannagari | |
| 7,249,246 B1 | 7/2007 | Banning et al. | |
| 7,315,956 B2 * | 1/2008 | Jensen et al. ................. | 713/500 |
| 7,334,086 B2 | 2/2008 | Hass et al. | |
| 7,401,223 B2 | 7/2008 | Walmsley | |
| 7,434,053 B2 | 10/2008 | Parry et al. | |
| 7,439,883 B1 | 10/2008 | Moni et al. | |
| 7,598,752 B2 | 10/2009 | Li | |

(Continued)

OTHER PUBLICATIONS

CodingLab, "I2C on an AVR using bit banging", Oct. 2008, from website "codinglab.blogspot.com/2008/10/i2c-on-avr-using-bit-banging.html" (hereinafter, CodingLab), 9 pages.*

(Continued)

*Primary Examiner* — Andrew Caldwell
*Assistant Examiner* — Yuqing Xiao (57) ABSTRACT

The present disclosure describes a serial control channel processor. In some aspects, a time-based instruction corresponding to a command is executed and a signaling event based on the time-based instruction is generated at a communication port. In other aspects a signal containing data is received at a communication port and a time-based instruction is executed to read data of the received signal.

19 Claims, 5 Drawing Sheets

(56) References Cited

U.S. PATENT DOCUMENTS

| | | | |
|---|---|---|---|
| 7,647,473 | B2 | 1/2010 | Kamigata et al. |
| 7,765,342 | B2 | 7/2010 | Whalley et al. |
| RE41,703 | E | 9/2010 | Pechanek et al. |
| 7,818,542 | B2 | 10/2010 | Shen et al. |
| 8,095,775 | B1 | 1/2012 | Khan |
| 8,116,457 | B2 | 2/2012 | Langton |
| 8,418,006 | B1 | 4/2013 | Trimberger |
| 8,610,454 | B2 | 12/2013 | Plusquellic et al. |
| 8,884,920 | B1 | 11/2014 | Switzer et al. |
| 9,354,890 | B1 | 5/2016 | Kang |
| 9,442,758 | B1 | 9/2016 | Sakarda et al. |
| 2002/0038222 | A1 | 3/2002 | Naka |
| 2002/0161986 | A1 | 10/2002 | Kamigata et al. |
| 2003/0001650 | A1 | 1/2003 | Cao et al. |
| 2003/0061519 | A1 | 3/2003 | Shibata et al. |
| 2003/0065813 | A1 | 4/2003 | Ruehle |
| 2004/0003246 | A1 | 1/2004 | Hopkins et al. |
| 2004/0268075 | A1 | 12/2004 | Qawami et al. |
| 2005/0050542 | A1 | 3/2005 | Davis et al. |
| 2007/0046511 | A1 | 3/2007 | Morzano et al. |
| 2007/0136561 | A1 | 6/2007 | Whalley et al. |
| 2007/0262962 | A1 | 11/2007 | XiaoPing et al. |
| 2008/0151670 | A1 | 6/2008 | Kawakubo et al. |
| 2008/0229070 | A1 | 9/2008 | Charra et al. |
| 2008/0232179 | A1 | 9/2008 | Kwak |
| 2009/0019257 | A1 | 1/2009 | Shen et al. |
| 2009/0055637 | A1 | 2/2009 | Holm et al. |
| 2009/0315258 | A1 | 12/2009 | Wallace et al. |
| 2009/0318229 | A1 | 12/2009 | Zielinski et al. |
| 2010/0088484 | A1 | 4/2010 | Roohparvar |
| 2010/0199288 | A1 | 8/2010 | Kalman |
| 2010/0272162 | A1* | 10/2010 | Simeon et al. ............... 375/220 |
| 2010/0282525 | A1 | 11/2010 | Stewart |
| 2011/0249718 | A1 | 10/2011 | Zerbe |
| 2012/0002803 | A1 | 1/2012 | Adi et al. |
| 2012/0106733 | A1 | 5/2012 | Falch et al. |
| 2013/0021482 | A1 | 1/2013 | Silverbrook |
| 2013/0311792 | A1 | 11/2013 | Ponnathota et al. |

OTHER PUBLICATIONS

Clements, "Principles of Computer Hardware", 4th Ed., 2006, Oxford University Press, Chap 10 "Buses and input/output mechanism", pp. 400-433.*
"Non-Final Office Action", U.S. Appl. No. 12/356,761, Dec. 24, 2013, 11 pages.
"Non-Final Office Action", U.S. Appl. No. 13/477,664, Dec. 20, 2013, 9 pages.
Constantinou, et al., "Performance Implications of Single Thread Migration on a Chip Multi-Core", ACM SIGARCH Computer Architecture News, vol. 33 Issue 4, Nov. 2005, 12 pages.
"Final Office Action", U.S. Appl. No. 12/254,506, (Oct. 13, 2011), 26 pages.
"Final Office Action", U.S. Appl. No. 12/356,761, (Jun. 3, 2011), 10 pages.
"Non-Final Office Action", U.S. Appl. No. 12/254,506, (Apr. 26, 2011), 18 pages.
"Non-Final Office Action", U.S. Appl. No. 12/274,235, (Mar. 17, 2011), 11 pages.
"Non-Final Office Action", U.S. Appl. No. 12/356,761, (Feb. 25, 2011), 8 pages.
"Notice of Allowance", U.S. Appl. No. 12/274,235, (Sep. 16, 2011), 6 pages.
Balakrishnan, Saisanthosh et al., "The Impact of Performance Asymmetry in Emerging Multicore Architectures", *In Proceedings of ISCA 2005*, (2005), 12 pages.
Kumar, Rakesh et al., "A Multi-Core Approach to Addressing the Energy-Complexity Problem in Microprocessors", *In Proceedings of WCED 2003*, (Jun. 2003), pp. 1-8.
Kumar, Rakesh et al., "Single-ISA Heterogeneous Multi-Core Architectures: The Potential for Processor Power Reduction", *In Proceedings of MICRO-36 2003*, (2003), 12 pages.
"Calling convention", Retrieved from <http://en.wikipedia.org/w/index.php?title=Calling_convention&oldid=162306164> on Apr. 15, 2014, Oct. 4, 2007, 2 pages.
"Final Office Action", U.S. Appl. No. 12/356,761, May 1, 2014, 6 pages.
"Non-Final Office Action", U.S. Appl. No. 12/254,506, Apr. 24, 2014, 18 pages.
"Notice of Allowance", U.S. Appl. No. 13/477,664, Jun. 27, 2014, 6 pages.
"X86 Disassembly/Functions and Stack Frames", Retrieved from <http://en.wikibooks.org/w/index.php?title=X86_Disassembly/Functions_and_Stack_Frames&oldid=840982> on Apr. 13, 2014, Apr. 23, 2007, 5 pages.
Magnusson, "Understanding stacks and registers in the Sparc architecture(s)", Retrieved from <http://web.archive.org/web/20071020054930/http://www.sics.se/~psm/sparcstack.html> on Apr. 15, 2014, Mar. 1997, 9 pages.
"Advisory Action", U.S. Appl. No. 12/356,761, Aug. 8, 2014, 3 pages.
"Final Office Action", U.S. Appl. No. 12/254,506, Oct. 9, 2014, 6 pages.
"Non-Final Office Action", U.S. Appl. No. 12/356,761, Nov. 18, 2014, 4 pages.
"Restriction Requirement", U.S. Appl. No. 12/356,761, Sep. 4, 2014, 5 pages.
"Final Office Action", U.S. Appl. No. 12/356,761, Mar. 4, 2015, 9 pages.
"Notice of Allowance", U.S. Appl. No. 13/531,244, Mar. 30, 2015, 14 pages.
Menezes, "Handbook of Applied Cryptography", CRC Press, Chapters 7 and 10, Oct. 1996, 104 pages.
Menezes, "Handbook of Applied Cryptography", CRC Press, ISBN: 0/8493-8523-7, Oct. 1996, 816 pages, available at <http://cacr.uwaterloo.ca/hac/>, Oct. 1996, pp. 323-325 and 388-391.
"Notice of Allowance", U.S. Appl. No. 12/254,506, Feb. 1, 2016, 7 pages.
"Corrected Notice of Allowance", U.S. Appl. No. 12/254,506, Apr. 11, 2016, 2 pages.
"Notice of Allowance", U.S. Appl. No. 12/356,761, May 25, 2016, 7 pages.

* cited by examiner

Fig. 1

| Serial Control Channel Processor | 134 |
|---|---|
| Microcontroller Sub-Block | 202 |
| Fetch Stage | 212 |
| Decode Stage | 214 |
| Execute Stage | 216 |
| Pipeline Controller | 218 |
| SRAM | 204 |
| Microcode | 206 |
| Command Queue | 208 |
| Processor Interrupt | 210 |
| SRAM Sub-Block | 220 |
| Register Sub-Block | 222 |
| APB Interface | 224 |
| CDMA Controller | 226 |
| Communication Port | 228 |
| GPIO | 230 |
| External Trigger Input | 232 |

SERIAL CONTROL CHANNEL PROCESSOR FOR EXECUTING TIME-BASED INSTRUCTIONS

RELATED APPLICATIONS

This application claims priority to U.S. Provisional Patent Application Ser. No. 61/303,876 filed Feb. 12, 2010, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Inkjet and laser print devices are prevalent in many home and office environments. Print devices employing inkjet or laser technology allow users to produce a wide range of printed media, from black and white documents to color photographs, conveniently and quickly on-site. Application-specific integrated circuits (ASICs) are typically employed in inkjet or laser printing devices to keep costs low while providing users with a diverse set of printing features. ASICs can be employed for printing devices using any one of a number of marking technologies, so the general term printing device will be used in further descriptions.

A system-level ASIC of a printing device is typically configured to interface with a specific set of analog ASICs and other support chips, which work in concert to perform various print functions. Analog ASICs and/or support chips made by different manufactures use different interfaces, or communication protocols, which are hard-coded into the system-level ASIC's limited memory. Hard-coding limits the number of analog ASICs and/or support chips with which the system-level ASIC can communicate with, as the hard-coded communication interfaces are not flexible enough to implement different or new communication protocols. As product life cycles for printing devices are short, significant time and resources are consumed hard-coding system-level ASICs that can only be implemented in a limited set of products.

SUMMARY

This summary is provided to introduce subject matter that is further described below in the Detailed Description and Drawings. Accordingly, this Summary should not be considered to describe essential features nor used to limit the scope of the claimed subject matter.

A method is described for executing a time-based instruction corresponding to a command, the time-based instruction having a timing parameter delaying execution of a subsequent instruction for an amount of time, the command being able to be performed by, but not understood by, a remote entity operably coupled with a communication port, and generating, based on the time-based instruction, a signaling event at the communication port for the amount of time to communicate the command to the remote entity, the generated signal understood by the remote entity.

Another method is described for receiving a signal at a communication port, the signal containing data useful to a remote entity which is unable to understand the signal, executing a time-based instruction to read the data of the signal, the time-based instruction having a timing parameter delaying execution of an instruction, and providing the data read from the signal to the remote entity, the data provided in a format understood by the remote entity.

A System-on-Chip is described that is configured to execute time-based instruction corresponding to a command, the time-based instruction having a timing parameter to delay execution of a subsequent instruction for an amount of time, the command able to be performed by, but not understood by, a remote entity operably coupled with the communication port, and generate, based on the time-based instruction, a signaling event at the communication port for the amount of time to communicate the command to the remote entity, the generated signal understood by the remote entity.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for hard-coding serial and/or parallel communication protocols can limit the number of print devices in which a system-level ASIC can be implemented. Hard-coding communication protocols for specific support-chips and analog ASICs is time and resource intensive, resulting in added development costs for a system-level ASIC with limited applications. This disclosure describes apparatuses and techniques for programmatic serial channel communication that allow a system-level ASIC to communicate with a wide variety of analog ASICs and/or support-chips with a flexible set of time-based instructions.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
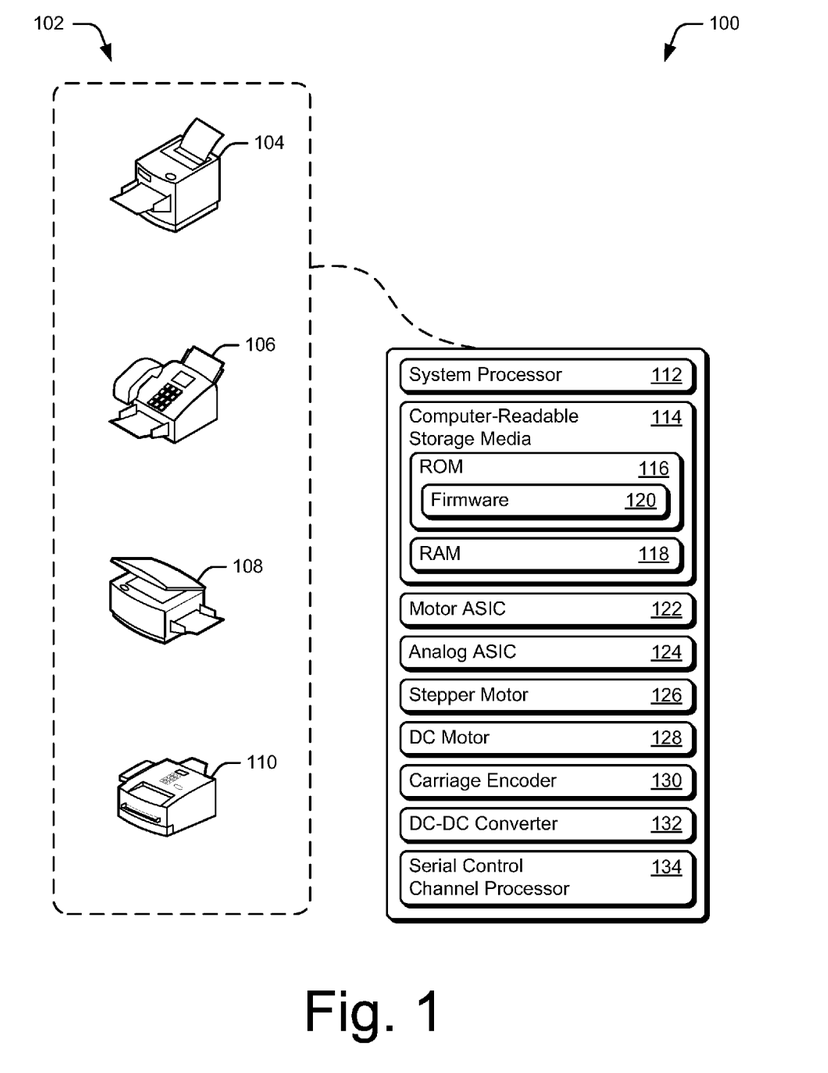
FIG. 1 illustrates an operating environment having print devices in accordance with one or more aspects.

FIG. 1 illustrates an example operating environment 100 having print devices 102, each of which are capable of printing various media via any marking technology (e.g. inkjet printing technology, laser printing technology, and so on). Print devices include desktop printer 104, fax machine 106, multi-function printer 108, and photo printer 110. Print devices 102 are capable of producing printed media from suitable types and/or sizes of media. For instance, desktop printer 104 may print black and white documents using standard copy paper or color photo prints using photo paper.

Print devices 102 are capable of receiving print instructions or print tasks from a variety of sources. Print instructions may be received from a local host, such as a host computer or camera device via universal serial bus (USB) or other point-to-point wired communication standard. Alternately or additionally, print instructions may be received over a wired or wireless network, such as a local area network (LAN) or a Wireless LAN or wireless personal-area-network. A print device 102 may also print a document based on an original document, such as fax machine 106 receiving a facsimile via a modem or multi-function printer 108 performing a copy operation.

Each print device 102 includes a system-level processor 112 and computer-readable storage media 114. System-level processor 112 can be any suitable type of processor for executing instructions associated with printing, scanning, copying, or faxing tasks, to name a few. Computer-readable storage media 114 may include any type and/or combination of suitable memory, such as read-only memory (ROM) 116 and random-access memory (RAM) 118. ROM 116 may include mask-programmable ROM (MROM) or Flash memory. RAM 118 may include static RAM (SRAM) or dynamic RAM (DRAM).

ROM 116 includes firmware 120, which is executed by system-level processor 112 to process print tasks and other system-level functions. Variables of firmware 120 and data stacks related to executing firmware 120 can be written to and/or read from RAM 118. In some cases, system-level processor 112 is integrated with ROM 116 and/or RAM 118 as a system-level ASIC, System-on-Chip (SoC), or an Application-Specific Standard Product (ASSP).

Print devices 102 also each include motor ASIC 122 and analog ASIC 124, which interface with various printing components. Although not shown, print devices 102 may also include other ASICs and support chips to provide additional printing functionalities. In this particular example, motor ASIC 122 controls stepper motor 126 and direct current (DC) motor 128. Stepper motor 126 picks up and advances media for printing. DC motor 128 moves a print carriage laterally across the media while printing. Analog ASIC 124 receives positional feedback from carriage encoder 130 as the print carriage moves and communicates with DC-DC converter 132, which provides power for print device 102.

Motor ASIC 122 and analog ASIC 124 communicate via serial control channels. Each ASIC and/or support chip of a print device may communicate using a different protocol, whether over a serial control channel or a parallel communication interface. In this instance, motor ASIC 122 communicates via a serial peripheral interface (SPI) protocol and analog ASIC 124 communicates via an inter-integrated circuit (I2C) protocol. Other serial communication protocols include, by way of example and not limitation, 1-Wire®, system management bus (SMBus), and other proprietary serial protocols.

Serial control channel processor (SCCP) 134 allows system-level processor 112 to interface with ASICs and support chips, such as, motor ASIC 122 and analog ASIC 124. Generally, SCCP 134 uses an appropriate communication protocol to communicate commands and data between system-level processor 112 and various ASICs and support chips. SCCP 134 may also be configured to communicate with external devices (not shown) across a wide range of print and/or non-print based applications. How SCCP 134 is implemented and used varies and is described below.

Figure 2:
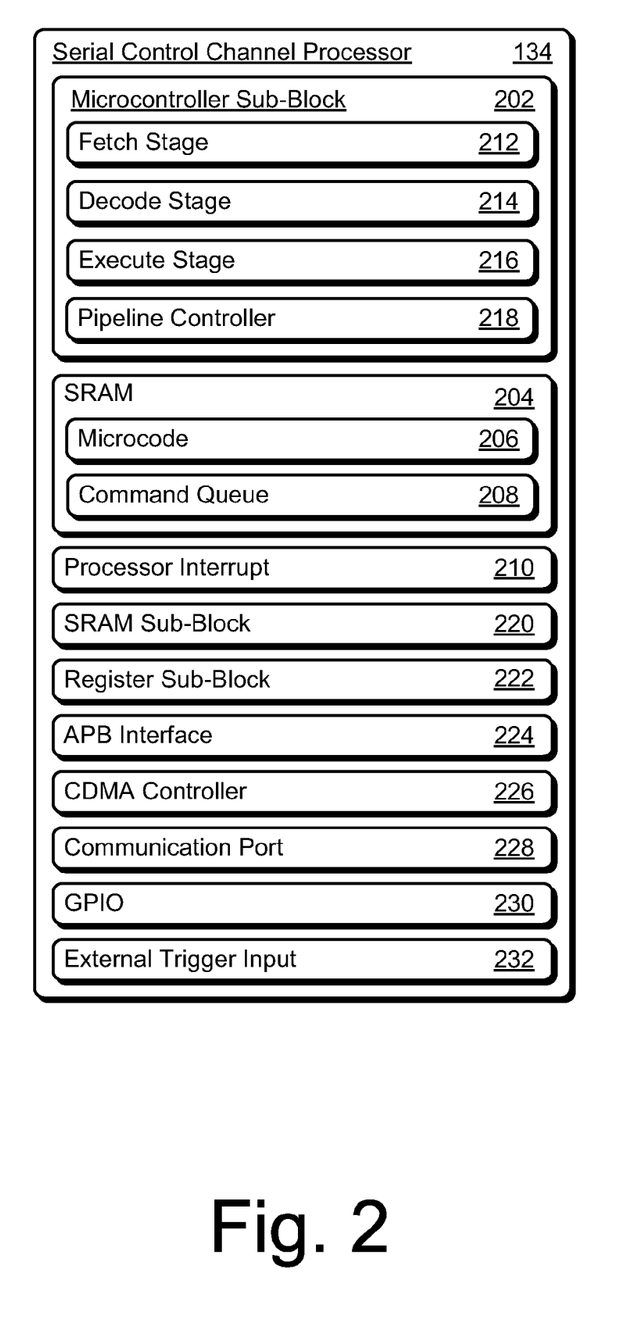
FIG. 2 illustrates a detailed aspect of an example serial control channel processor shown in FIG. 1.

FIG. 2 illustrates a detailed example of SCCP 134, which is capable of communicating with various ASICs and support chips. SCCP 134 includes microcontroller sub-block 202 and SRAM 204, which contains microcode 206 that is executable to, among other things, emulate various communication protocols. SRAM 204 also contains command queue 208 to receive commands from system-level processor 112. Commands received from system-level processor 112 are communicated to ASICs and support chips, or carried out otherwise by SCCP 134 by executing microcode 206. When a command is complete or command queue 208 is empty, SCCP 134 can signal system-level processor 112 via processor interrupt 210.

Microcontroller sub-block 202 contains a full microcontroller pipeline containing three pipe stages. These stages include fetch stage 212, decode stage 214, and execute stage 216 for executing instructions of microcode 206 associated with commands of command queue 208. Activity of the three pipe stages is coordinated by pipeline controller 218, which detects pipeline hazards and forwards data where necessary to reduce pipeline stalls. Pipeline controller 218 can be implemented as a state machine for controlling execution of the pipeline stages. Execution of the pipeline can be managed by conditioning a pipeline stage's execution based on a readiness of a downstream pipeline stage.

Each stage of the pipeline, as well as system-level processor 112, may access SRAM 204 for data and/or instructions as needed. SRAM sub-block 220 arbitrates access to SRAM 204 between the requesting stages of the pipeline and system-level processor 112 based on priority. Typically, priority for SRAM 204 is defined as, from highest to lowest, execute stage 216, decode stage 214, fetch stage 212, and system-level processor 112. By refusing to acknowledge a request until SRAM 204 is available, SRAM sub-block 220 holds off lower-priority requestors minimizing pipeline stalls or bubbles.

Register sub-block 222 interfaces advanced peripheral bus (APB) interface 224 allowing system-level processor 112 to access registers of SCCP 134 (not shown). Register address space is mapped separately from SRAM 204 by register sub-block 222 defining register locations accessible to system-level processor 112. Access to the registers is prioritized, with SCCP 134 having priority over a process of system-level processor 112 for access to a register when both attempt to access a register during the same clock cycle. Register sub-block 222 also provides multiple interfaces allowing the pipeline stages to access register locations during instruction execution.

By way of example, consider an instruction pointer register accessed by fetch stage 212 to fetch an instruction from SRAM 204. Fetch stage 212 issues a read-request to SRAM sub-block 220 for the instruction. When SRAM sub-block 220 acknowledges the request, fetch stage 212 handshakes with pipeline controller 218 and passes the instruction on to the next stage or a pipeline isolation register (not shown) between stages. Pipeline isolation registers may be located between pipeline stages to break up timing through the pipeline when clocked by pipeline controller 218.

The fetched instruction is decoded by decode stage 214, which reads any required register operands associated with the instruction. For load or store operations, decode stage 214 handshakes with pipeline controller 218 for access to SRAM 204. Additionally, decode stage 214 can analyze register operands for possible hazards before the instruction is passed to execute stage 216. In some cases, decode stage 214 pre-executes jump instructions to prevent pipeline bubbles on a jump taken. Conditional compare flags can be used by decode stage 214 in determining whether to pre-execute a jump instruction. By pre-executing jump instructions in decode stage 214 rather than in execute stage 216, the pipeline can be redirected immediately to a new instruction avoiding a pipeline stall.

Execute stage 216 executes the decoded instruction and writes the results of the instruction. Any register or SRAM operands necessary for execution are received from decode stage 214. Depending on the instruction executed, results of the executed instruction may be written to one or more registers or RAM 118 via central direct-memory access (CDMA) controller 226. For instance, a set data command updates a data register, the instruction pointer register, and a parity register.

By executing instructions through the pipeline stages, any suitable communication protocol can be emulated at communication port 228. Communication port 228 can include any number of data and/or clock lines. Although shown as a single communication port, communication port 228 may represent any suitable number of communication ports for interfacing with various ASICs and support chips. Aspects of communication port 228 can be configured in any suitable way, including by way of example and not limitation, directionality, timing, impedance, parity, clocking, and polarity.

A time-based instruction set allows various parameters of signaling and timing of communication port 228 to be deterministically programmed. Collections of time-based instructions can be executed to emulate any suitable communication protocol. By way of example, sub-routines including collections of time-based instructions can be used to write ones and/or zeros at a communication port in accordance with a serial or custom communication protocol. Timing or baud-rate of the data transmitted (or received) at the communication port can be configured by setting an appropriate time-delay of various instructions within the sub-routines.

Pipeline controller 218 includes a counter to implement a delay to control an instruction's execution timing. By delaying execution of an instruction, or a subsequent instruction, timing of data and clock lines of communication port 228 can be precisely controlled. Executing time-based instructions that directly control data and clock lines of communication port 228 can generate a custom serial waveform using only a small number of instructions. Additionally, by delegating commands to SCCP 134, system-level processor 112 is free to perform other system functions, while SCCP 134 executes instructions associated with the commands.

Time-based instructions are executed based on a system-level clock or an APB clock, which typically run at 200 MHz and 100 Mhz respectively (these are higher in frequency than many serial control communication protocols). By including a 20-bit delay field in the instruction set, signaling frequencies as low as 190 Hz based on a 200 Mhz clock or 95 Hz based on a 100 Mhz clock can be achieved. Alternate implementations of an SCCP may use a different bit-width for the delay field depending on the intended application. Additionally, a no-operation (NOP) instruction can reduce signaling frequencies even further. Thus, based on a suitable system clock, a wide range of signaling frequencies can be generated for emulating different communication protocols.

SCCP 134 supports serial communication protocols having up to two 32-bit sequential control streams for information including device select, device address, and/or device control. Additionally, SCCP 134 supports up to two 32-bit sequential data streams, which may be combined with the two control streams for a serial transaction of up to 64 bits of address and control with up to 64 bits of data. While driving two data lines, SCCP 134 supports separate streams for 32 bits of address and control with 32 bits of data per serial transaction.

SCCP 134 also includes general purpose input/output (GPIO) 230, which may include any suitable number of bidirectional GPIO lines. Each GPIO may be driven high ("1"), low ("0") or to a high impedance state ("Hi-Z"). When embodied with an APB module, some of the GPIO lines may not be exposed. Additionally, multiplexing some GPIO lines with four-pin or six-pin DC motor controller lines or other GPIOs of the APB module can conserve pin count. When multiplexed with DC motor controller lines, encoder inputs and/or pulse-width modulation (PWM) outputs of the APB module operate normally. The instruction set of SCCP 134 directly controls GPIO 230, which allows SCCP 134 to support wider serial protocols or parallel protocols via GPIO.

External trigger input 232 of SCCP 134 receives trigger events from other modules, such as carriage encoder 130. Although shown as a single external trigger input, SCCP 134 may include any suitable number of external trigger inputs. Receiving external trigger events allows SCCP 134 to pace and control execution of code based on external events such as position or time related inputs.

Techniques of Programmatic Serial Channel Communication

The following discussion describes techniques of programmatic serial channel communication. These techniques can be implemented using the previously described environment, such as SCCP 134 of FIG. 1 embodied on a print device 102. These techniques include methods illustrated in FIGS. 3 and 4, each of which is shown as a set of operations performed by one or more entities. These methods are not necessarily limited to the orders shown for performing the operations. Further, these methods may be used in conjunction with one another whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
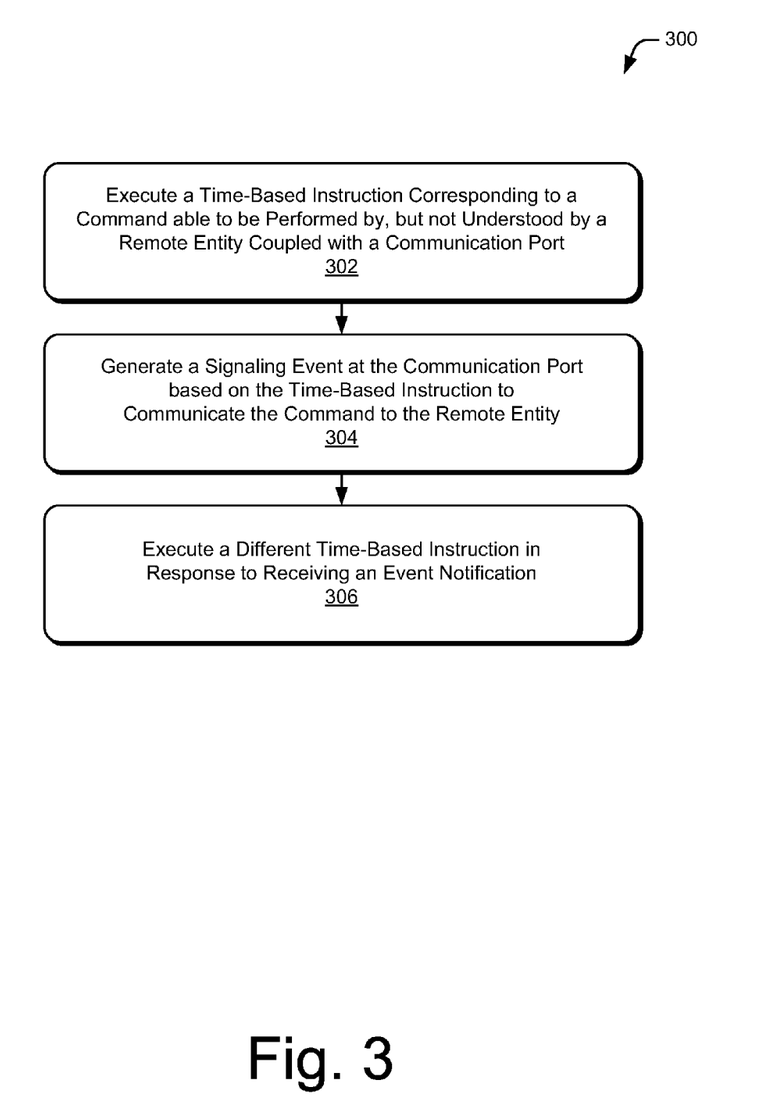
FIG. 3 illustrates a method of executing a time-based instruction to communicate with a remote entity.

FIG. 3 depicts a method 300 for executing a time-based instruction to communicate with a remote entity coupled with a communication port.

At 302, a time-based instruction having a timing parameter delaying execution of a subsequent instruction for an amount of time is executed. The timing parameter may delay execution of another time-based instruction. The time-based instruction or a collection of time-based instructions can be associated with a command received from a system-level processor or fetched from a command queue. In some cases, the command is able to be performed by a remote entity operably coupled to a communication port, but the remote entity cannot understand the command. Executing a collection of time-based instructions, however, creates electrical signaling events to emulate a communication protocol that can be received and interpreted by the remote entity.

For example, SCCP 134 executes a collection of time-based instructions associated with a command received from system-level processor 112. Assume here, that the command is targeted at motor ASIC 122 to use stepper motor 126 to pick up and advance printing media to start a print job. Also assume that motor ASIC 122 communicates via SPI serial protocol and that system-level processor 112 is not configured to communicate via SPI serial protocol.

At 304, a signaling event is generated, based on the time-based instruction, at a communication port to communicate the command to a remote entity. The duration of the signaling event corresponds to the timing parameter of the time-based instruction. Although the command may not be understood by the remote entity, the generated signaling event is understood by the remote entity. The generated signaling event(s) may emulate a serial communication protocol of the remote entity such as I²C, SPI, 1-Wire®, or a proprietary serial protocol, to name a few. For example, the signaling event may be a rising or falling transition of a clock or data line emulating a portion of a serial protocol of a support chip. Programmatic control of sequential signaling events is used to emulate the full communication protocol.

In the context of the present example, SCCP 134 generates a waveform emulating a SPI protocol by executing the collection of time-based instructions associated with the command for stepper motor 126 to pick up and advance printing media. In this particular example, the timing parameters of the time-based instructions is set based on a frequency of the SPI communication protocol allowing the command to be understood by motor ASIC 122.

Optionally, at 304 additional signaling events are generated, based on the time-based instruction or collection of time-based instructions, at the communication port to communicate with the remote entity. The additional signaling events may emulate a parallel or non-serial communication protocol for communicating with the remote entity. In some instances, a custom communication protocol may be "bit-banged" using data lines and/or GPIOs to communicate with an ASIC or support chip having a custom interface.

The command with which the time-based instructions are associated can be fetched from a command queue or received from a system-level processor. After the signaling event(s) corresponding with the command are generated, a higher-level processor may be alerted that the command is complete or that the command queue is empty. Operations of blocks 302 and 304 may be repeated in order to communicate a command to the remote entity by generating a stream of serial communication. In such cases, the stream of serial communication includes serial control information and serial data that is compatible with a communication protocol of the remote entity. Continuing the present example, after instructions associated with the command to have stepper motor 126 pick up and advance the printing media are executed, an alert indicating that the command is complete is sent to system-level processor 112.

Optionally, at 306, a different time-based instruction is executed in response to receiving an event notification at an input or the communication port. The event notification can be received at any suitable input such as a GPIO configured as an input or an external trigger input. Executing the time-based instruction in response to the event notification is useful for pacing and/or controlling execution of commands. Concluding the present example, SCCP 134 receives, from motor ASIC 122, a notification that stepper motor 126 has picked up and advanced the printing media. SCCP 134 then executes instructions associated with the next command in the command queue in order to continue the print job.

Figure 4:
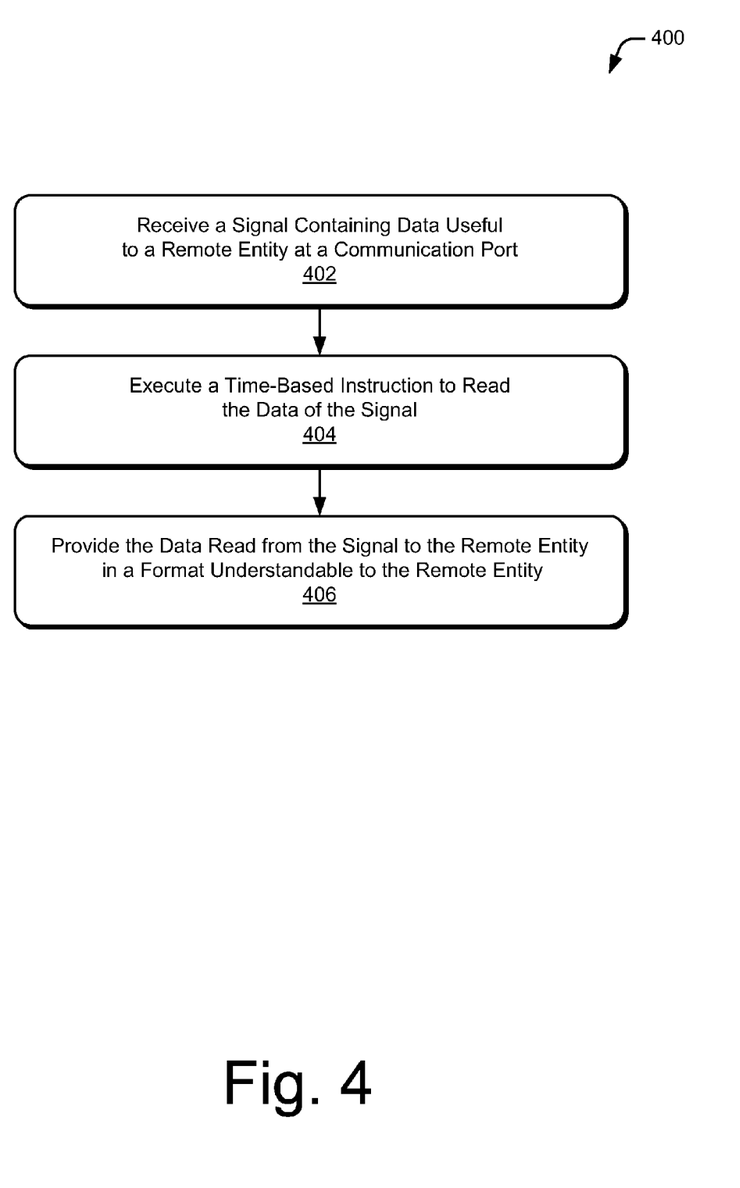
FIG. 4 illustrates a method of executing a time-based instruction to read data from a signal received at a communication port.

FIG. 4 depicts a method 400 for executing a time-based instruction to read data from a signal received at a communication port, including operations performed by SCCP 134 of FIG. 1.

At 402, a signal is received at a communication port. The signal contains data useful to a remote entity, but the remote entity may not be able to understand the signal. The signal may be compliant with a serial communication protocol such as I²C, SPI, 1-Wire®, or a proprietary serial protocol to name a few. In other cases, the signal may comprise several signals of a parallel or custom communication protocol.

For example, SCCP 134 receives a signal, from carriage encoder 130, at communication port 228. Assume that the signal contains positional information useful to system-level processor 112 for performing a printing task. Also assume that carriage encoder 130 communicates via an I²C serial protocol and that system-level processor 112 is not configured to communicate via the I²C serial protocol.

At 404, a time-based instruction is executed to read the data of the received signal. The time-based instruction has a timing parameter delaying execution of an instruction. Execution of the time-based instruction or a subsequent instruction may be delayed by the timing parameter. In cases when the received signal includes a bit of data, operation of block 404 is repeated to read subsequent bits of data from the signal. Setting timing parameters of time-based instructions associated with signaling events for a data or clock line based on a frequency of the received signal's communication protocol allows a stream of data to be read.

In the context of the present example, SCCP 134 executes a time-based instruction to read positional information from the signal received from carriage encoder 130. The timing parameter of the time-based instruction is based on a frequency of the I²C serial protocol allowing SCCP 134 to receive data from carriage encoder 130. Assume here that the positional information indicates that a print carriage associated with carriage encoder 130 has reached a home position.

At 406, the data read from the signal is provided to the remote entity in a format understandable to the remote entity. In some cases, the data is stored in memory accessible to the remote entity, such as a register or shared SRAM. The shared SRAM may be system level SRAM accessed via a CDMA controller or local SRAM accessed via an SRAM sub-block. The remote entity may be alerted when data read from the signal is accessible.

Concluding the present example, SCCP 134 stores the positional information in a register of SRAM 204 and alerts system-level processor 112 that the information is accessible. System-level processor 112 can then access the positional information of carriage encoder 130 and continue the print task.

System-on-Chip

Figure 5:
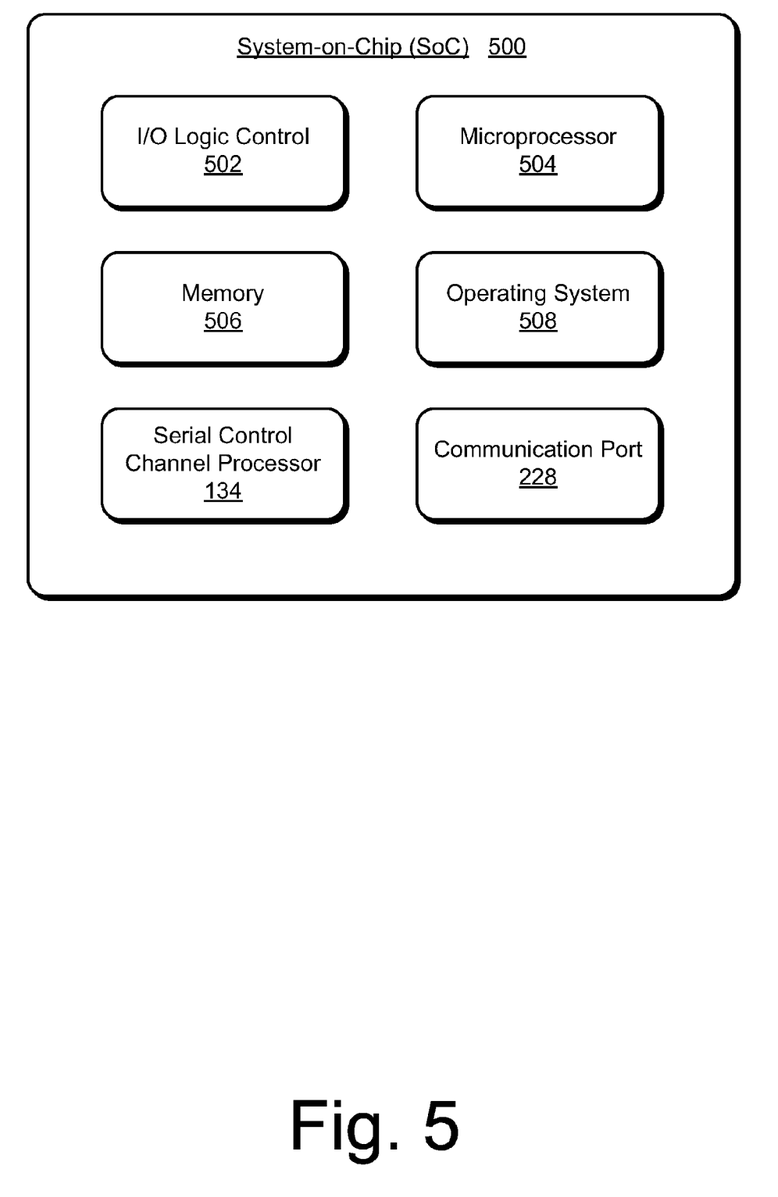
FIG. 5 illustrates a System-on-Chip (SoC) environment for implementing aspects of the techniques described herein.

FIG. 5 illustrates a System-on-Chip (SoC) 500, which can implement various embodiments described above. A SoC can be implemented in any suitable printing device, such as a printer, photo printer, fax machine, multifunction print device, and/or any other type of device that may implement inkjet or other printing technologies (e.g., laser printing technology and so on).

SoC 500 can be integrated with electronic circuitry, a microprocessor, memory, input-output (I/O) logic control, communication interfaces and components, other hardware, firmware, and/or software needed to run an entire device. SoC 500 can also include an integrated data bus (not shown) that couples the various components of the SoC for data communication between the components. A wireless communication device that includes SoC 500 can also be implemented with many combinations of differing components.

In this example, SoC 500 includes various components such as an input-output (I/O) logic control 502 (e.g., to include electronic circuitry) and a microprocessor 504 (e.g., any of a microcontroller or digital signal processor). SoC 500 also includes a memory 506, which can be any type of RAM, low-latency nonvolatile memory (e.g., flash memory), ROM, and/or other suitable electronic data storage. SoC 500 can also include various firmware and/or software, such as an operating system 508, which can be computer-executable instructions maintained by memory 506 and executed by microprocessor 504. SoC 500 can also include other various communication interfaces and components, communication components, other hardware, firmware, and/or software.

SoC 500 includes SCCP 134 and communication port 228 (embodied as disparate or combined components as noted above). Examples of these various components, functions, and/or entities, and their corresponding functionality, are described with reference to the respective components of the environment 100 shown in FIG. 1 and FIG. 2.

SCCP 134 in SoC 500, either independently or in combination with other entities, can be implemented as computer-executable instructions maintained by memory 506 and executed by microprocessor 504 to implement various embodiments and/or features described herein. SCCP 134 may also be provided integral with other entities of the SoC, such as integrated with one or both of I/O logic controller 502 or communication port 228. Alternatively or additionally, SCCP 134 and the other components can be implemented as hardware, firmware, fixed logic circuitry, or any combination thereof that is implemented in connection with the I/O logic control 502 and/or other signal processing and control circuits of SoC 500.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   receiving, via a command queue and first communication protocol, a command from firmware or an operating system of a device;
   executing, based on the command, a time-based instruction to generate a signal logic level at a pin of a communication interface, the time-based instruction indicating the signal logic level to generate and including a delay value specifying a duration of time by which to delay execution of subsequent instructions, the command being able to be performed by a component of the device that is coupled to the communication interface and unable to communicate via the first communication protocol;
   delaying, after the time-based instruction is executed and while the signal logic level is generated, execution of other instructions and re-execution of the time-based instruction for the duration of time specified by the delay value of the time-based instruction, the signal logic level generated at the pin of the communication interface for the duration of time effective to communicate, via a second communication protocol, part of the command to the component of the device, the component of the device capable of communicating via the second communication protocol; and
   resuming, after the duration of time specified by the delay value elapses, the re-execution of the time-based instruction or the execution of the other instructions to generate a different signal logic level at the pin of the communication interface.

2. The method of claim 1, wherein the time-based instruction is a first time based instruction and the other instructions include at least a second time-based instruction that is different from the first.

3. The method of claim 1, wherein generating the signal logic level for the duration of time emulates the second communication protocol by which the component of the device is capable of communicating.

4. The method of claim 3, wherein the emulated second communication protocol includes an inter-integrated circuit ($I^2C$), serial peripheral interface (SPI), or 1-Wire® protocol having a signaling frequency of approximately 95 Hz to 200 MHz.

5. The method of claim 1, wherein the second communication protocol is a parallel communication protocol and the method further comprises executing additional time-based instructions to generate, at other pins of the communication interface, respective signal logic levels such that the signal logic level generated at the pin of the communication interface and the respective signal logic levels generated at the other pins of the communication interface emulate the parallel communication protocol.

6. The method of claim 1, further comprising:
   receiving an event notification at an input or another pin of the communication interface; and
   executing, responsive to receiving the event notification, a different time-based instruction, the execution of the different time-based instruction paced by the event notification.

7. The method of claim 1, further comprising alerting the firmware or operating system of the device that one or more actions of the command are complete or the command queue from which the command was received is empty.

8. A method comprising:
   receiving, via a first communication protocol, a signal at a communication port, the signal representing data useful to firmware or an operating system of a device, the firmware or operating system of the device unable to communicate via the first communication protocol;
   executing, via a processor, a time-based instruction to read a bit of the data represented by the signal, the time-based instruction indicating a register to which the bit of the data is to be stored and including a delay value specifying an amount of time by which to delay execution of subsequent instructions; storing, responsive to execution of the time-based instruction, the bit of the data to the register indicated by the time-based instruction, the register being accessible to the firmware or operating system of the device via a second communication protocol, the firmware or operating system capable of communicating via the second communication protocol;
   delaying, after executing the time-based instruction and storing the bit of the data to the register, execution of other instructions and re-execution of the time-based instruction for the duration of time specified by the delay value; and
   resuming, after the duration of time specified by the delay value elapses, the execution of the other instructions or the re-execution of the time-based instruction to read another bit of the data represented by the signal.

9. The method of claim 8, wherein the signal received at the communication port is compliant with a serial communication protocol.

10. The method of claim 9, wherein the serial communication protocol includes an I²C, SPI, or 1-Wire® protocol having a signaling frequency of approximately 95 Hz to 200 MHz.

11. The method of claim 8, further comprising alerting the firmware or operating system of the device that the data represented by the signal is accessible.

12. The method of claim 8, wherein:
the data represented by the signal includes multiple bits of data and the bit of the data is a first bit of the multiple bits; and
the method further comprises:
executing an additional time-based instruction or re-executing the time-based instruction to read at least a second bit of the multiple bits of data represented by the signal, and
storing the at least the first and second bits of the data to the register that is accessible via the second communication protocol.

13. A system-on-chip comprising:
a command queue to receive, via a first communication protocol, commands from firmware or an operating system of a device;
a communication interface to transmit signals to a component of the device that communicates via a second communication protocol and is unable to communicate via the first communication protocol;
a clock input to receive a clock signal from a clock system of the device;
a counter that decrements, based on the clock signal, a value once per cycle of the clock signal received at the clock input;
a memory to store processor-executable instructions that include time-based instructions for implementing the second communication protocol;
a hardware-based processor that, responsive to executing the processor-executable instructions, implements operations comprising:
fetching, from the command queue and via the first communication protocol, a command provided by the firmware or operating system;
selecting, from the time-based instructions, a time-based instruction that corresponds to the command provided by the firmware or operating system, the time-based instruction indicating a signaling event to generate at the communication interface and including a delay value specifying a duration of time for which the signaling event is to be generated;
loading the delay value of the time-based instruction into the counter that decrements once per cycle of the clock signal;
executing the time-based instruction to generate the signaling event by altering an electrical state of the communication interface effective to communicate, via the second communication protocol, a part of the command to the component of the device;
delaying, after execution of the time-based instruction and until the counter decrements the delay value of the time-based instruction to zero, execution of other instructions and re-execution of the time-based instruction effective to generate the signaling event at the communication interface for the duration of time specified by the delay value; and
resuming, responsive to the counter decrementing the delay value to zero, the re-execution of the time-based instruction or the execution of the other instructions to generate a different signal logic level at a pin of the communication interface.

14. The system-on-chip of claim 13, wherein the second communication protocol is a serial protocol and the generated signaling event communicates the part of the command in accordance with the serial communication protocol.

15. The system-on-chip of claim 14, wherein the serial communication protocol includes an I²C, SPI, or 1-Wire® protocol having a signaling frequency of approximately 95 Hz to 200 MHz.

16. The system-on-chip of claim 13, further comprising computer-readable storage media and wherein the command queue for receiving the commands is embodied on the computer-readable storage media.

17. The system-on-chip of claim 13, wherein the hardware-based processor is further configured to:
implement a state machine to manage execution of the time-based instruction in an instruction execution pipeline; and
mitigate timing or register conflicts with other time-based instructions in the instruction execution pipeline.

18. The system-on-chip of claim 13, wherein
delaying the execution of other instructions and the re-execution of the time-based instruction comprises preventing the hardware-based processor from executing any instruction while the counter decrements the delay value of the time-based instruction.

19. The system-on-chip of claim 13, wherein the duration of time is equal to the delay value divided by a frequency of the clock signal.

* * * * *